(12) United States Patent
Vajapeyam

(10) Patent No.: US 9,811,469 B2
(45) Date of Patent: Nov. 7, 2017

(54) SEQUENTIAL ACCESS OF CACHE DATA

(71) Applicant: EMPIRE TECHNOLOGY DEVELOPMENT LLC, Wilmington, DE (US)

(72) Inventor: Sriram Vajapeyam, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 218 days.

(21) Appl. No.: 14/407,761

(22) PCT Filed: Jan. 29, 2014

(86) PCT No.: PCT/US2014/013599
§ 371 (c)(1),
(2) Date: Dec. 12, 2014

(87) PCT Pub. No.: WO2015/094389
PCT Pub. Date: Jun. 25, 2015

(65) Prior Publication Data
US 2016/0283386 A1 Sep. 29, 2016

(30) Foreign Application Priority Data
Dec. 16, 2013 (IN) .......................... 5851/CHE/2013

(51) Int. Cl.
*G06F 12/08* (2016.01)
*G06F 12/0873* (2016.01)
(Continued)

(52) U.S. Cl.
CPC ...... *G06F 12/0873* (2013.01); *G06F 12/0811* (2013.01); *G06F 12/0875* (2013.01);
(Continued)

(58) Field of Classification Search
CPC ........................................... G06F 12/00–12/16
See application file for complete search history.

(56) References Cited

U.S. PATENT DOCUMENTS 6,728,839 B1 * 4/2004 Marshall ............. G06F 12/0862
711/137
7,467,377 B2 12/2008 Wu et al.
(Continued)

OTHER PUBLICATIONS

Lin, Charles; "Direct Mapped Cache", http://www.cs.umd.edu/class/sum2003/cmsc311/Notes/Memory/direct.html, Archived via archive.org Dec. 1, 2005; Retrieved Mar. 4, 2017.*
(Continued)

*Primary Examiner* — Nicholas Simonetti
(74) *Attorney, Agent, or Firm* — Moritt Hock & Hamroff LLP; Steven S. Rubin, Esq.

(57) ABSTRACT

Technologies are generally described for methods and systems effective to access data in a cache. In an example, a method to access data in a cache may include processing a first request for data at a first memory address related to first data in a memory. The method may further include retrieving the first data from the memory. The method may further include storing the first data in a first cache line in the cache. The method may further include processing a second request for data at a second memory address related to second data in the memory. The method may further include retrieving the second data from the memory. The method may further include selecting a second cache line in the cache to store the second data based on the storage of the first data. The method may further include storing the second data in the second cache line.

16 Claims, 6 Drawing Sheets

(51) Int. Cl.
G06F 12/0877 (2016.01)
G06F 12/0875 (2016.01)
G06F 12/0811 (2016.01)
G06F 12/0888 (2016.01)

(52) U.S. Cl.
CPC ...... *G06F 12/0877* (2013.01); *G06F 12/0888* (2013.01); *G06F 2212/1016* (2013.01); *G06F 2212/224* (2013.01); *G06F 2212/283* (2013.01); *G06F 2212/455* (2013.01); *G06F 2212/604* (2013.01)

(56) References Cited

U.S. PATENT DOCUMENTS

| | | | |
|---|---|---|---|
| 7,890,699 | B2 | 2/2011 | Comparan et al. |
| 2002/0040421 | A1 | 4/2002 | Muta |
| 2004/0205300 | A1 | 10/2004 | Bearden |
| 2004/0267902 | A1 | 12/2004 | Yang |
| 2005/0250211 | A1 | 11/2005 | Reinhardt et al. |
| 2006/0179240 | A1 | 8/2006 | Chatterjee et al. |
| 2008/0104329 | A1 | 5/2008 | Gaither et al. |
| 2008/0144826 | A1 | 6/2008 | Chang |
| 2008/0222343 | A1* | 9/2008 | Veazey ............... G06F 12/0862 711/3 |
| 2012/0030431 | A1* | 2/2012 | Anderson ........... G06F 12/0862 711/137 |

OTHER PUBLICATIONS

"Bloom Filters," accessed at http://web.archive.org/web/20140409214926/http://en.wikipedia.org/wiki/Bloom_filter, modified on Apr. 1, 2014, pp. 14.

Agarwal, A., and Pudar, D., S., "Column-associative caches: a technique for reducing the miss rate of direct-mapped caches," Computer Architecture, 1993, Proceedings of the 20th Annual International Symposium, May 16-19, 1993, pp. 179-190.

Banu, J. S., "Study on Data Prefetching techniques for Linked Data Structure Applications," IRACST—International Journal of Computer Science and Information Technology & Security (IJCSITS), ISSN: 2249-9555, 2012, pp. 1-4, vol. 2, No. 1.

Chen, Y., et al., "Data Access History Cache and Associated Data Prefetching Mechanisms," SC '07 Proceedings of the 2007 ACM/IEEE conference, 2007, pp. 1-12.

Chilimbi, M., T., et al., "Cache-Conscious Data Structures," accessed at http://web.archive.org/web/20131007213315/http://research.microsoft.com/en-us/um/people/trishulc/papers/ccds.pdf, accessed on Oct. 31, 2014, pp. 17.

Collins, J., et al., "Pointer Cache Assisted Prefetching," In Proceedings of the 35th Annual International Symposium on Microarchitecture (MICRO-35), Nov. 2002, pp. 1-12.

Gschwind, M., "The Cell Broadband Engine: Exploiting multiple levels of parallelism in a chip multiprocessor," International Journal of Parallel Programming, Jun. 2007, vol. 35, pp. 233-262, Issue 3.

Hallberg, J., et al., "Cache-Conscious Allocation of Pointer-Based Data Structures Revisited with HW/SW Prefetching," in '2 n d Annual Workshop on Duplicating, Deconstructing, and Debunking, 2003, pp. 1-12.

Haring, R. A., et al., "The Blue Gene/Q Compute Chip," Micro, IEEE, Mar.-Apr. 2012, pp. 48-60, vol. 2, Issue 2.

International Search Report for International Application No. PCT/US2014/013599, mailed on Aug. 29, 2014, 10 pages.

Kim, C., et al., "An adaptive, non-uniform cache structure for wire-delay dominated on-chip caches," International Conference on Architectural Support for Programming Languages and Operating Systems (ASPLOS), Oct. 2002, pp. 1-12.

Lira, J., "Implementing a hybrid SRAM / eDRAM NUCA architecture," High Performance Computing (HiPC), 2011 18th International Conference, Dec. 18-21, 2011, pp. 1-10.

Loh, G. and Hill, M.D., "Supporting Very Large DRAM Caches with Compound-Access Scheduling and MissMap,". Micro, IEEE, May-Jun. 2012, pp. 70-78, vol. 32, Issue 3.

Luk, K. C. and Mowry, C. T., "Compiler-Based Prefetching for Recursive Data Structures," In Proceedings of the Seventh International Conference on Architectural Support for Programming Languages and Operating Systems, 1996, pp. 222-233.

Tendler, J.M., "Power 7 Processors: The Beat Goes On," accessed at http://web.archive.org/web/20131228150014/http://www.valleytalk.org/wp-content/uploads/2010/09/POWER7-The-Beat-Goes-On.pdf, accessed on Oct. 31, 2014, pp. 50.

* cited by examiner

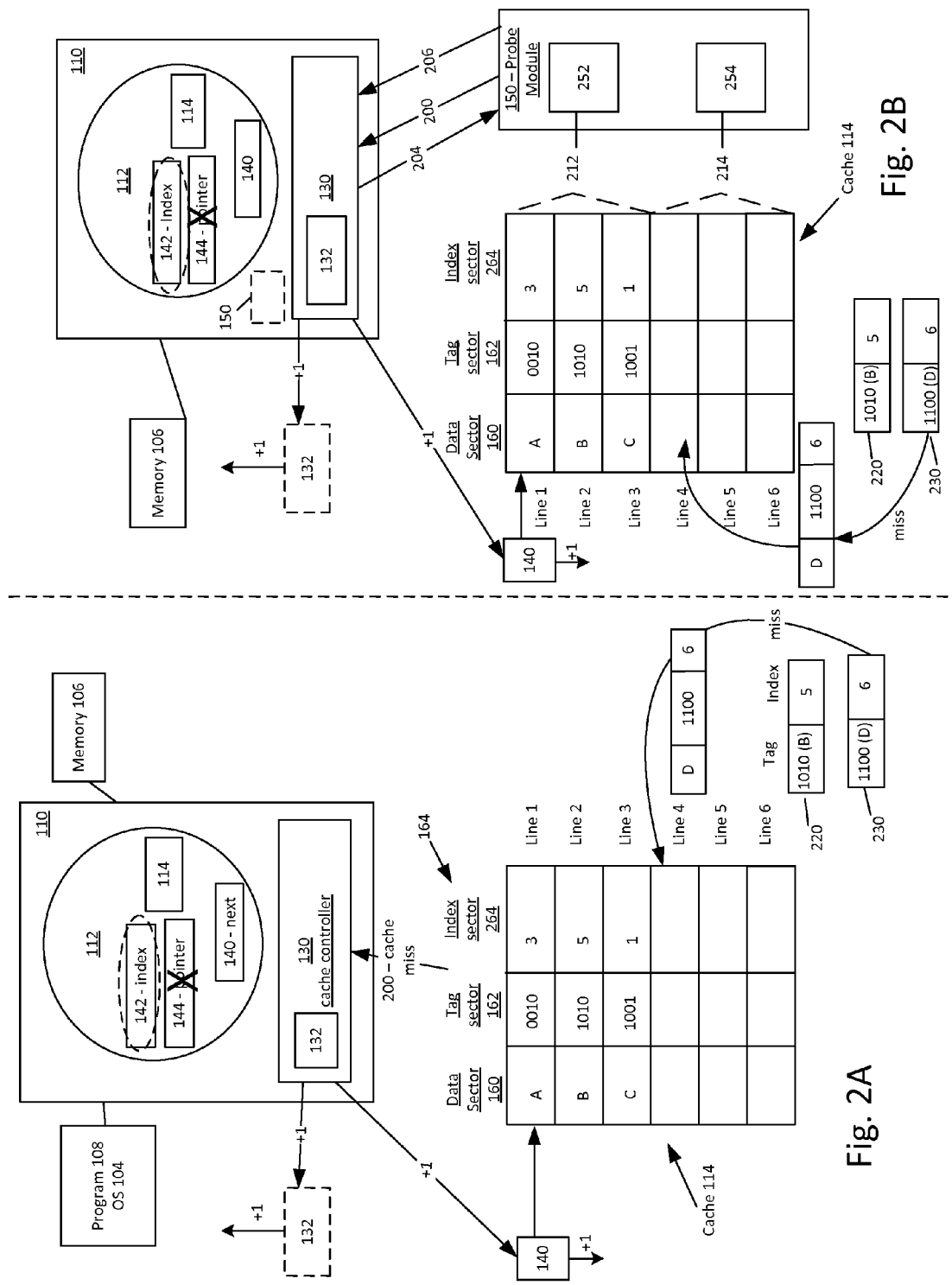

500 A computer program product.

502 A signal bearing medium.

504

At least one of

One or more instructions to access data in a cache; or

One or more instructions to process a first request for data at a first memory address, wherein the first memory address relates to first data in a memory; or One or more instructions to retrieve the first data from the memory; or One or more instructions to store the first data in a first cache line in the cache; or One or more instructions to process a second request for data at a second memory address, wherein the second memory address relates to second data in the memory; or One or more instructions to retrieve the second data from the memory; or One or more instructions to select a second cache line in the cache to store the second data based on the storage of the first data in the first cache line so that the second cache line is sequential to the first cache line; or One or more instructions to store the second data in the second cache line in the cache.

| 506 A computer readable medium | 508 A recordable medium | 510 A communications medium |

Fig. 5

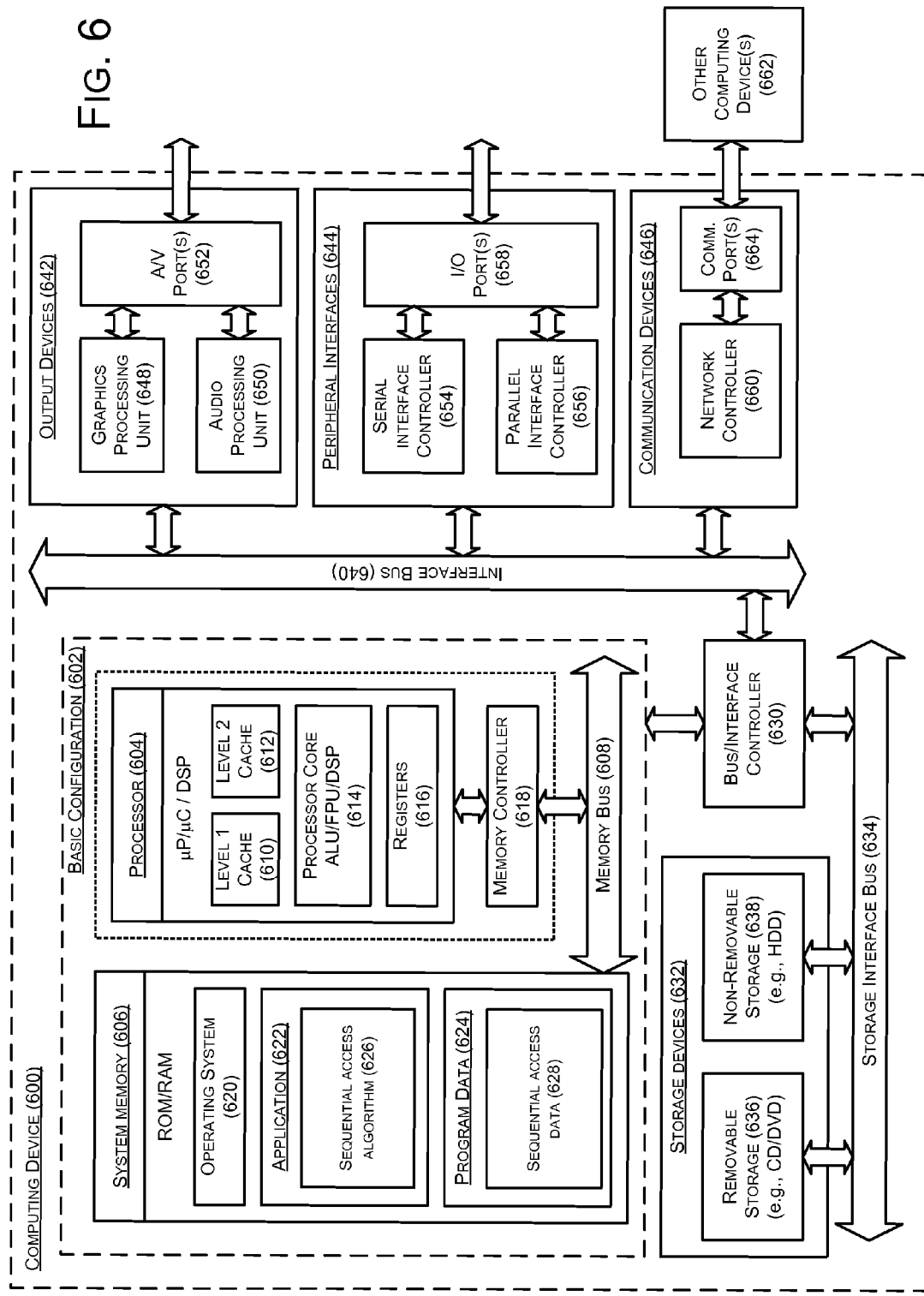

SEQUENTIAL ACCESS OF CACHE DATA

CROSS-REFERENCE TO RELATED APPLICATIONS

This application is a U.S. national stage filing under 35 U.S.C. §371 of International Application No. PCT/US14/13599, filed on Jan. 29, 2014, which claims priority under PCT Article 8 and/or 35 U.S.C. §119(a) to Indian Patent Application No. 5851/CHE/2013, filed on Dec. 16, 2013. The entirety of the International Application and the Indian Patent Application is hereby incorporated by reference.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single package. A cache may be used to store data for access by one or more of the processor cores. The data can be a subset of data stored in a typically larger memory that is typically located outside of the die and/or a subset of data stored in another cache of any size that is on-chip or off-chip. Each processor core may be provided with a cache that stores data for the processor. Each processor core may be configured to access data from a respective cache using a cache access pattern. An operating system configured to be in communication with the multi-core processor may determine a cache access pattern for each processor core.

SUMMARY

In some examples, methods to access data in a cache are generally described. The methods may include processing a first request for data at a first memory address. The first memory address may relate to first data in a memory. The methods may further include retrieving the first data from the memory. The methods may further include storing the first data in a first cache line in the cache. The methods may further include processing a second request for data at a second memory address. The second memory address may relate to second data in the memory. The methods may further include retrieving the second data from the memory. The methods may further include selecting a second cache line in the cache to store the second data based on the storage of the first data in the first cache line. The second cache line may be sequential to the first cache line. The methods may further include storing the second data in the second cache line in the cache.

In some examples, methods to access data in a cache are generally described. The methods may include processing a first request for data at a first memory address. The first memory address may relate to first data in a memory at a first memory index line. The methods may further include retrieving the first data from the memory. The methods may further include identifying a mapped cache line mapped to the first memory index line. The methods may further include storing the first data in a cache line in the cache. The cache line may be different from the mapped cache line. The methods may further include storing a value in an index sector in the cache line that identifies the first memory index line.

In some examples, processors effective to access data in a cache are generally described. The processors may include a core, a cache, and/or a cache controller. The cache controller may be configured to be in communication with the core and the cache. The cache controller may be effective to process a first request for data at a first memory address. The first memory address may relate to first data in a memory. The cache controller may be further effective to retrieve the first data from the memory. The cache controller may be further effective to store the first data in a first cache line in the cache. The cache controller may be further effective to process a second request for data at a second memory address. The second memory address may relate to second data in the memory. The cache controller may be further effective to retrieve the second data from the memory. The cache controller may be further effective to select a second cache line in the cache to store the second data based on the storage of the first data in the first cache line. The second cache line may be sequential to the first cache line. The cache controller may be further effective to store the second data in the second cache line in the cache.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2A illustrates the example system of FIG. 1 relating to an example of storage of data sequentially and access of data sequentially;

FIG. 2B illustrates the example system of FIG. 1 relating to an example of storage of data sequentially and access of data using an indexing scheme;

FIG. 5 illustrates an example computer program product that can be utilized to implement sequential access of cache data; and FIG. 6 is a block diagram illustrating an example computing device that is arranged to implement sequential access of cache data, all arranged according to at least some embodiments described herein.

DETAILED DESCRIPTION

Figure 1:
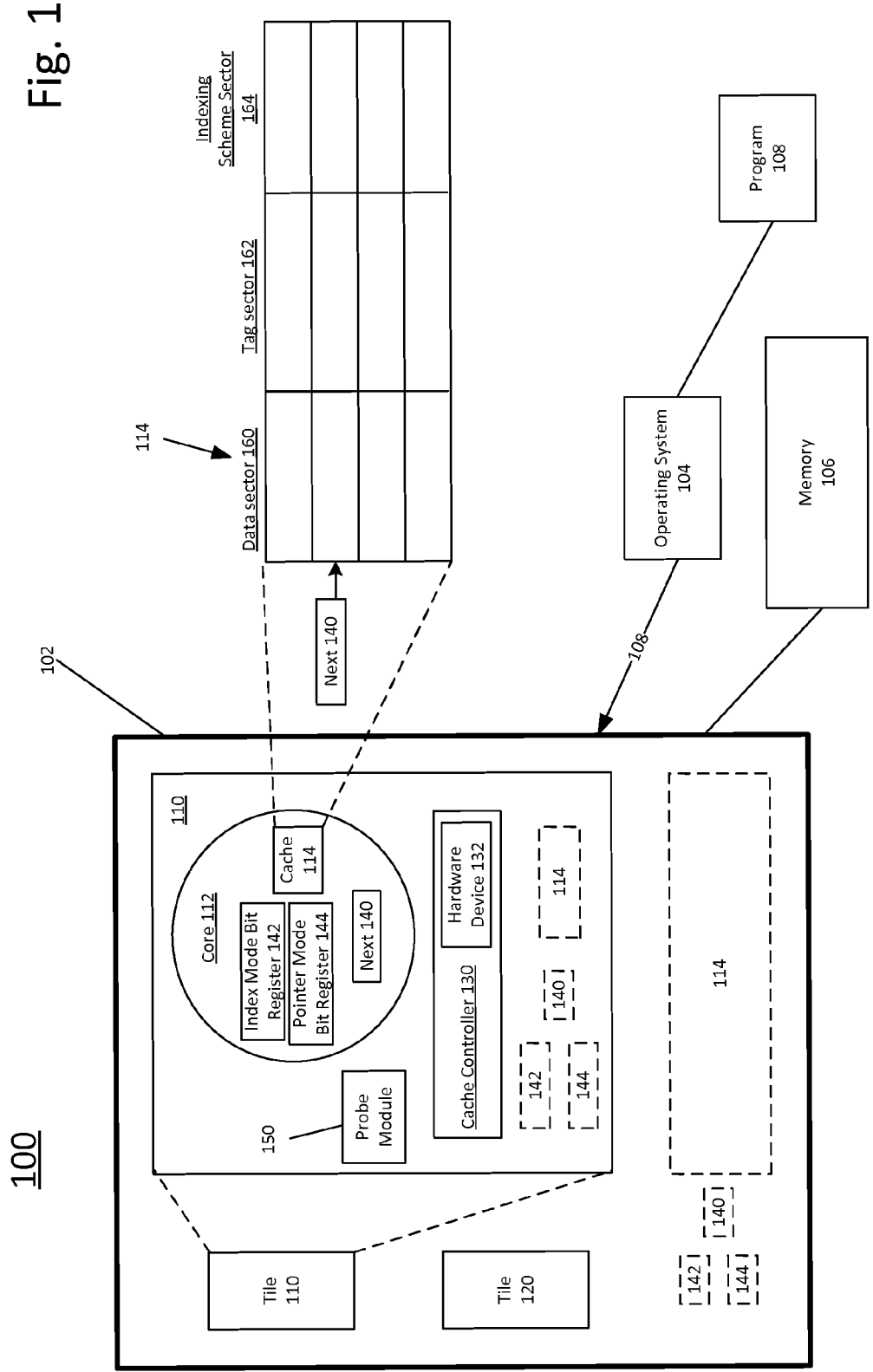
FIG. 1 illustrates an example system that can be utilized to implement sequential access of cache data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementation of sequential access of cache data.

Briefly stated technologies are generally described for methods and systems effective to access data in a cache. In an example, a method to access data in a cache may include processing a first request for data at a first memory address related to first data in a memory. The method may further include retrieving the first data from the memory. The method may further include storing the first data in a first cache line in the cache. The method may further include processing a second request for data at a second memory address related to second data in the memory. The method may further include retrieving the second data from the memory. The method may further include selecting a second cache line in the cache to store the second data based on the storage of the first data. The method may further include storing the second data in the second cache line.

FIG. 1 illustrates an example system that can be utilized to implement sequential access of cache data, arranged in accordance with at least some embodiments described herein. An example system 100 may include a processor such as a multi-core processor 102 (sometimes "processor" herein) and/or a memory 106. Memory 106 may be inside or outside of processor 102. An operating system 104 may be configured to send a program 108 to processor 102 for execution. Processor 102 may include a tile 110 and/or a tile 120. Focusing on tile 110, tile 110 may include a core 112, a cache controller 130 and/or a probe module 150. Core 112 may include a cache 114, a next register 140, an index mode bit register 142 and/or a pointer mode bit register 144. Cache 114 may be a cache at one or more levels such as a L1 cache that may be inside of core 112, an L2 cache inside tile 110, or an L3 cache outside of tile 110. Next register 140, index mode bit register 142 and/or pointer mode bit register 144 may be at the same level as the respective cache 114 and thus may be inside core 112, inside tile 110 or outside of tile 110. Each of these elements will be explained in more detail below.

Cache controller 130 may be configured to be in communication with core 112, cache 114, next register 140, index mode bit register 142, pointer mode bit register 144 and/or probe module 150. Cache controller 130 may include a hardware device 132. Hardware device 132 may be a device, such as a counter, effective to record a number of cache misses in cache 114. Cache controller 130 may be configured to access, such as by reading or writing, data in cache 114. Next register 140 may be configured to store a value of an address of a cache line of cache 114. Cache controller 130 may modify values in next register 140, index mode bit register 142 and/or pointer mode bit register 144 such as based on data in hardware device 132 relating to cache misses or based on a command from program 108.

Cache 114 may include a data sector 160, a tag sector 162 and/or indexing scheme sector 164. Data sector 160, tag sector 162 and/or indexing scheme sector 164 may be located in a same cache or in separated caches or in different types of memory. For example, data sector 160 may be located in an eDRAM (Embedded Dynamic Random Access Memory) while tag sector 162 and indexing scheme sector 164 may be located in a SRAM (Static Random Access Memory).

As discussed in more detail below, data in cache 114 may be accessed under a particular mode. In a first mode, data may be stored and accessed sequentially in cache 114 based on values in indexing scheme sector 164. For example, data may be stored in cache 114 and accessed sequentially through incrementing values in next register 140 and analyzing values in indexing scheme sector 164. In a second mode, data may be stored sequentially in cache 114 and accessed through use of an indexing scheme. Data in index mode bit register 142 and/or data in pointer mode bit register 144 may be used to selectively activate or deactivate an access mode.

FIG. 2A illustrates the example system of FIG. 1 relating to an example of storage of data sequentially and access of data sequentially, arranged in accordance with at least some embodiments described herein. FIG. 2A includes elements in system 100 of FIG. 1, with additional details. Those components in FIG. 2A that are labeled identically to components of FIG. 1 will not be described again for the purposes of clarity and brevity.

Cache controller 130 may monitor data in hardware device 132 and activate or deactivate index mode bit register 142 and/or pointer mode bit register 144 in response to the monitoring. In an example, when a number of cache misses identified in hardware device 132 reaches a threshold value, cache controller 130 may activate index mode bit register 142 such as assigning a binary value of "1". The activation is highlighted by a dotted circle in FIG. 2A. In these examples, after cache controller 130 activates index mode bit register 142, cache controller 130 may further examine pointer mode bit register 144 to ensure that pointer mode bit register 144 is deactivated. The deactivation is highlighted with an "X" in FIG. 2A.

In the example shown in FIG. 2A, when index mode bit register 142 is activated, indexing scheme sector 164 may be implemented as an index sector 264. Index mode bit register 142 may be activated in response to identifying a number of cache misses above a threshold, as mentioned above, or for other reasons. For example, program 108 or operating system 104 may activate index mode bit register 142.

In examples where index mode bit register 142 is activated, cache controller 130 may store data from memory 106 into cache 114 in sequential lines. Sequential lines may include lines of cache 114 separated by the same interval—such as separated by one line, two lines, etc. Cache controller 130 may store a value corresponding to an address of a first line of cache 114 in next register 140. In the example shown in FIG. 2A, cache controller 130 may respectively store data "A", tag "0010" and index "3" in data sector 160, tag sector 162 and index sector 264 in line 1 of cache 114. After storage of data "A", cache controller 130 may increment the value (as illustrated by "+1") stored in next register 140 to store an address of a second line ("line 2") of cache 114. In the example, cache controller 130 may respectively store data "B", tag "1010" and index "5" in data sector 160, tag sector 162 and index sector 264 in line 2 of cache 114. Cache controller 130 may then increment the value stored in next register 140 and may continue to store data sequentially.

Values stored in index sector 264 may correspond to index values from memory 106. For example, data "A" may be stored in an index line in memory 106 where the index line from memory 106 is mapped to index line "3" of cache 114. In the example, data "A" is stored in a line different from the mapped cache line. The mapping between lines in memory 106 and lines in cache 114 may be stored in a table accessible by cache controller 130.

Continuing the example in FIG. 2A, after data is stored in cache 114, a memory address 220 in memory 106 may be requested during execution of program 108. In the example, memory address 220 includes a tag with a value of "1010" and index with a value of "5". Cache controller 130 may analyze data in cache 114 sequentially based on the value stored in next register 140. A value corresponding to an address of line 1 of cache 114 may be stored in next register 140. In the example shown, cache controller 130 may identify and compare tag "0010" and index "3" from line 1 of cache 114 with tag "1010" and index "5" of memory address 220. Cache controller 130 may determine a cache miss has occurred and generate a cache miss signal. In response to generation of cache miss signal 200, cache controller 130 may increment data in hardware device 132 (as illustrated by "+1") and may also increment the value stored in next register 140. The value in next register 140 may be replaced with a label corresponding to an address of line 2 of cache 114. Cache controller 130 may then compare tag "1010" and index "5" from line 2 of cache 114 with tag "1010" and index "5" of memory address 220. Cache controller 130 may determine a cache hit has occurred and retrieve data "B" from cache 114. Cache controller 130 may send data "B" to core 112 for further execution of program 108.

In examples where core 112 requests data stored sequentially in cache 114, cache controller 130 may continue to experience cache hits while incrementing the value a stored in next pointer 140. These cache hits may indicate that data may be accessed quickly and sequentially from cache 114. Data retrieval speed may be further increased when data in subsequent cache lines of cache 114 are pre-fetched and stored in a buffer of cache controller 130 before receipt of a memory request.

In another example operation, a memory address 230 in memory 106 may be requested by program 108. In an example, memory request 230 may relate to data "D" with tag 1100 and index line 6. Cache controller 130 may store a value corresponding to an address of line 1 of cache 114 in next register 140. Cache controller 130 may identify and compare tag "0010" and index "3" from line 1 of cache 114 with tag "1100" and index "6" of memory address 230. Cache controller 130 may determine a cache miss has occurred. Cache controller 130 may increment data in hardware device 132 by one and may also increment the value stored in next register 140 by one. A value stored in next register 140 may be replaced with a value corresponding to an address of line 2 of cache 114. Cache controller 130 may continue to sequentially extract data from tag sector 162 and index sector 264 from lines of cache 114 for comparison with tag "1100" and index "6" of memory address 230 before searching other lines in cache 114. After comparison with line 3 of cache 114, cache controller 130 may determine no data is stored in the remaining lines of cache 114. Cache controller 130 may retrieve data "D" from memory 106 and send data "D" to core 112 for further execution of program 108. Cache controller 130 may respectively store data "D", tag "1100" and index "6" in data sector 160, tag sector 162 and index sector 264 in line 4 of cache 114.

FIG. 2B illustrates the example system of FIG. 1 relating to an example of storage of data sequentially and access of data using an indexing scheme, arranged in accordance with at least some embodiments described herein. FIG. 2B includes elements in system 100 of FIGS. 1 and 2A, with additional details. Those components in FIG. 2B that are labeled identically to components of FIGS. 1 and 2A will not be described again for the purposes of clarity and brevity.

In some examples, when index mode bit register 142 is activated, cache controller 130 may activate the probe module 150. Probe module 150 may include hardware components 252, 254, such as bloom filters, to facilitate search for data in cache 114. Probe module 150 may further include components to monitor and/or maintain hardware components 252, 254. Cache controller 130 may send an instruction 204 to probe module 150. Instruction 204 may include instructions to search for data in cache 114. In response to receiving instruction 204, probe module 150 may use hardware components 252, 254 to search for data in cache 114. In an example, cache controller 130 may assign hardware component 252 to lines 1, 2 and 3 as shown by 212 and assign hardware component 254 to lines 4, 5, and 6 as shown by 214.

In the example shown in FIG. 2B, memory address 220 in memory 106 may be requested by program 108 during execution. Memory address 220 may include index "5". Cache controller 130 may send instruction 204 to probe module 150 to search for data associated with memory address 220 in cache 114. In response to instruction 204, hardware component 252 may search lines 212 for index "5" and/or tag "1010" and hardware component 254 may search lines 214 for index "5" and/or tag "1010". Probe module 150 may generate a signal 206 and send signal 206 to cache controller 130. Signal 206 may be effective to indicate that at least one line in lines 212 may include index "5" and/or tag "1010". In response to receiving signal 206, cache controller 130 may reset next register 140 to store a value corresponding to an address of line 1 in lines 212. Cache controller 130 may thereafter analyze cache 114 sequentially starting at line 1 for memory address 220.

In another example, memory address 230 in memory 106 may be requested by program 108 during execution. Memory address 230 may include index "6" and correspond to data "D". Cache controller 130 may send instruction 204 to probe module 150 to facilitate search for data associated with memory address 230 in cache 114. In response to instruction 204, hardware component 252 may search lines 212 for index "6" and/or tag "1100" and hardware component 254 may search lines 214 for index "6" and/or tag "1100". Probe module 150 may generate a signal 206 and send signal 206 to cache controller 130. Signal 206 may be effective to indicate index "6" and/or tag "1100" may not be in lines 212 nor lines 214. Cache controller 130 may retrieve data "D" from memory 106 and send data "D" to core 112 for further execution of program 108. Cache controller 130 may respectively store data "D", tag "1100" and index "6" in data sector 160, tag sector 162 and index sector 264 in line 4 of cache 114.

In an example, cache 114 may be partitioned in more than one region and each region may include more than one cache line. Regions of a cache may be assigned with different index mode bit registers so that one region may retrieve data sequentially as in FIG. 2A and one region may retrieve data using an indexing scheme as in FIG. 2B. Each region may be addressed with a bit in a memory address.

Among other features, a system in accordance with the disclosure may allow data to be accessed from a cache in a sequential manner which may result in quicker access to data. Some types of data, such as linked lists and trees, may be accessed sequentially but may be scattered throughout a memory. Such programs may benefit from sequential storage. Flexibility in cache storage may be introduced in that data may be stored sequentially in a cache and accessed either sequentially (as in FIG. 2A) or through use of an indexing scheme (as in FIG. 2B).

Accessing data using the indexing scheme may also be used when handling cache coherence among multiple caches. Cache coherence among multiple caches may occur where multiple caches can access and store data in the same memory location simultaneously and a particular cache may receive an external request for that memory location from another cache or core and the particular cache may serve the request with corresponding stored data. Related data may be stored in sequential lines in a cache. Such data may have otherwise been assigned to the same cache line resulting in some data displacing other data.

Figure 3B:
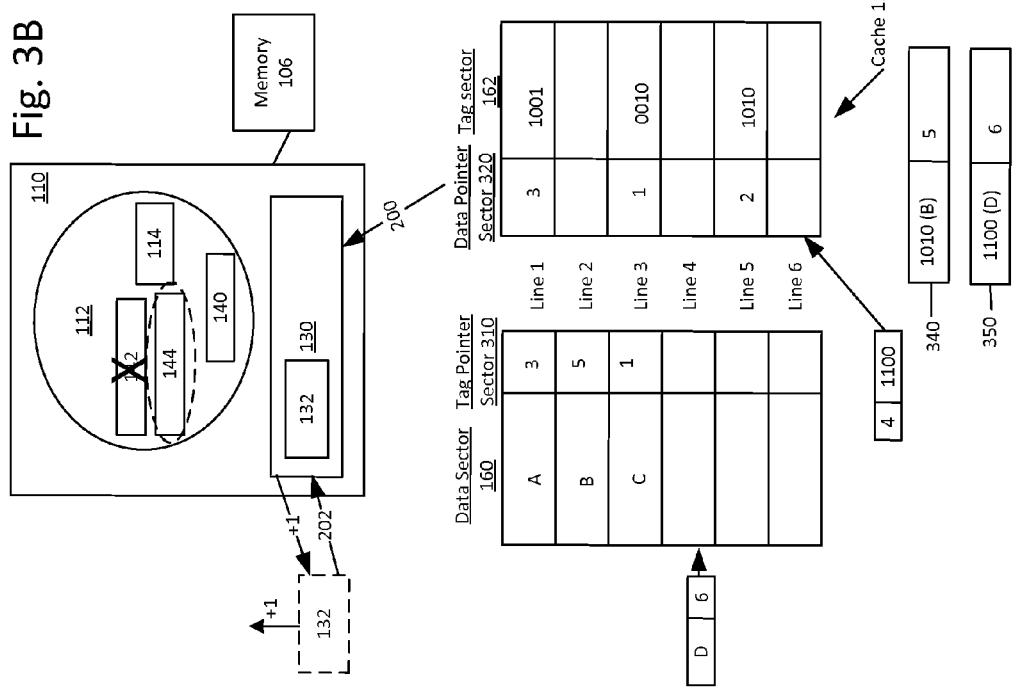
FIG. 3B illustrates the example system of FIG. 1 relating to an example of decoupled tag and data values with an indexing scheme access.
Figure 3A:
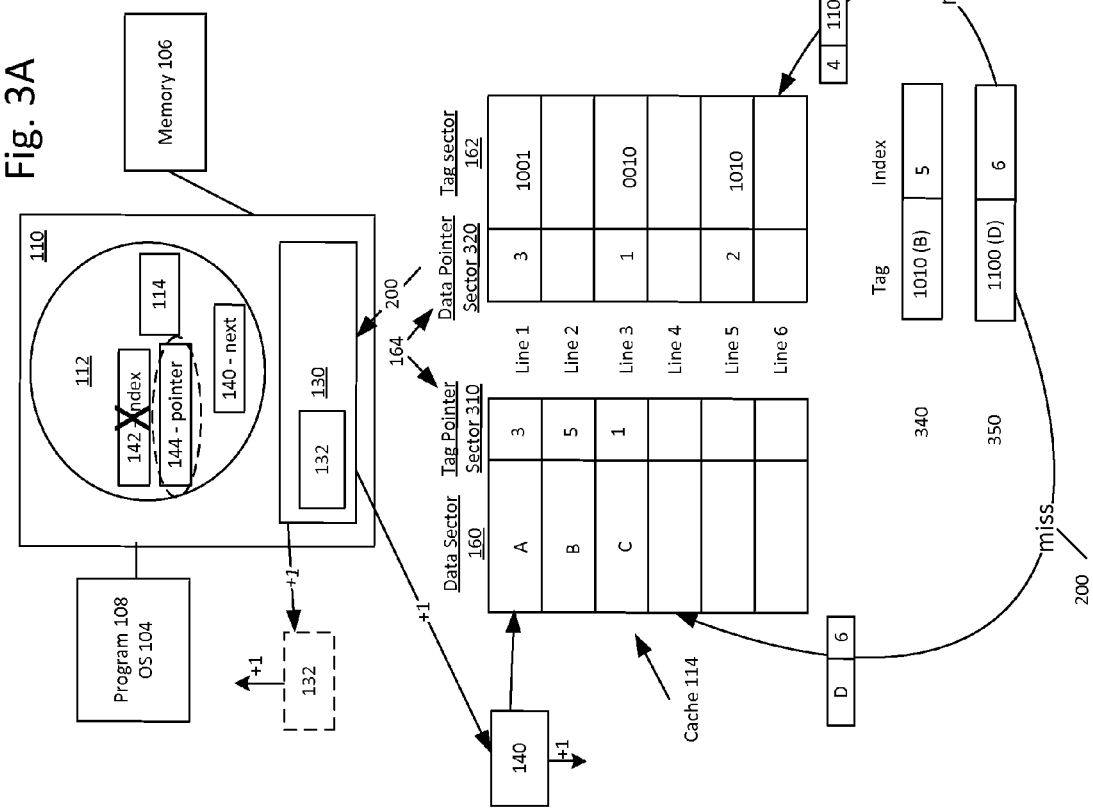
FIG. 3A illustrates the example system of FIG. 1 relating to an example of decoupled tag and data values with sequential access.

FIG. 3A illustrates the example system of FIG. 1 relating to an example of decoupled tag and data values with sequential access, arranged in accordance with at least some embodiments described herein. FIG. 3A includes elements in system 100 of FIG. 1, with additional details. Those components in FIG. 3A that are labeled identically to components of FIG. 1 will not be described again for the purposes of clarity and brevity.

Cache controller 130 may monitor data in hardware device 132 and activate or deactivate pointer mode bit register 144 in response to the monitoring or for other reasons such as in response to program 108 or operating system 104. In an example, when data, such as a number of cache misses, in hardware device 132 reaches a threshold value, cache controller 130 may activate pointer mode bit register 144 such as assigning a binary value of "1". Activation is highlighted with a dotted circle in FIG. 3A. In these examples, after cache controller 130 activates pointer mode bit register 144, cache controller 130 may further examine index mode bit register 142 to ensure that index mode bit register 142 is deactivated. Deactivation is highlighted with an "X" in FIG. 3A.

In the example in FIG. 3A, when pointer mode bit register 144 is activated, indexing scheme sector 164 may be implemented as tag pointer sector 310 and data pointer sector 320. In one example, data sector 160 and tag pointer sector 310 may be in an eDRAM (embedded dynamic random access memory) and tag sector 162 and data pointer sector 320 may be in a different type of memory such as SRAM (static random access memory). Cache controller 130 may store data from memory 106 into data sector 160 in sequential addresses. Sequential addresses may include lines of cache separated by the same interval—such as separated by one line, two lines, etc.

In an example, cache controller 130 may retrieve data "A" corresponding to an index line "3" and tag "0010" from memory 106. Cache controller 130 may store a value corresponding to an address of a first line ("line 1") of data sector 160 in next register 140. Cache controller 130 may respectively store data "A" and tag pointer "3" in data sector 160 and tag pointer sector 310 respectively of line 1 of cache 114 instead of storing data "A" in a third line of cache 114 as might otherwise be dictated by a tag pointer with a value of "3". Based on a tag pointer with a value of "3", cache controller 130 may store tag "0010" in line 3 of tag sector 162. Cache controller 130 may analyze the label stored in next register 140 and a store data pointer with a value of "1" in data pointer sector 320 indicating that the data corresponding to the tag in line 3 is stored in line 1 of data sector 160. Cache controller 130 may then increment the value stored in next register 140. Cache controller 130 may continue to store data in data sector 160 sequentially by incrementing next register 140 (as illustrated by "+1") and may continue to update tag sector 162 and data pointers sector 320 accordingly.

In an example, a memory address 340 in memory 106 may be requested by program 108 during execution. Memory address 340 may include tag "1010" and index "5". Cache controller 130 may store a value corresponding to an address of line 1 of data sector 160 in next register 140. Cache controller 130 may analyze tag pointer "3" in line 1 of tag pointer sector 310 and extract tag "0010" from line 3 of tag sector 162. Cache controller 130 may identify and compare tag "0010" from line 3 of tag sector 162 with tag "1010" of memory address 220. Cache controller 130 may determine a cache miss has occurred. In response to generation of a cache miss signal, cache controller 130 may increment the value in hardware device 132 and may also increment the value stored in next register 140. The value stored in next register 140 may be replaced with a value corresponding to an address of line 2 of data sector 160. Cache controller 130 may analyze tag pointer "5" in line 2 of tag pointer sector 310 and extract tag "1010" from line 5 of tag sector 162. Cache controller 130 may determine a cache hit has occurred. Cache controller 130 may retrieve data "B" from line 2 of data sector 160 and increment the value stored in next register 140.

In examples where processor 102 requests data stored sequentially in cache 114, cache controller 130 may continue to experience cache hits while incrementing the value stored in next pointer 140. These cache hits may indicate that data may be quickly accessed sequentially from cache 114. Data in subsequent cache lines may be pre-fetched and stored in a buffer of the cache controller even before receipt of a memory request further increasing a speed of retrieval of data from the cache.

In another example, a memory address 350 may be requested by program 108 during execution. Memory address 230 may include a tag "1100", an index "6" and may relate to data "D". Cache controller 130 may store a value corresponding to an address of line 1 in tag pointer sector 310 in next register 140. Cache controller 130 may analyze tag pointer "3" in line 1 of tag pointer sector 310 and extract tag "0010" from line 3 of tag sector 162. Cache controller 130 may identify and compare tag "0010" with tag "1100" of memory address 230. Cache controller 130 may determine a cache miss has occurred and may increment data in hardware device 132 and may also increment the value stored in next register 140. The value stored in next register 140 may be replaced with an address of line 2 of tag pointer sector 310.

Cache controller 130 may continue to analyze data in tag pointer sector 310 sequentially and extract data from tag sector 162 accordingly for comparison with tag "1100" of memory address 230. After comparison with data associated with line 3 of tag pointer sector 310, cache controller 130 may determine no data is stored in the remaining lines in tag pointer sector 310. Cache controller 130 may retrieve data "D" from memory 106 and store data "D" in line 4 of data sector 160 and index "6" in line 4 of tag pointer sector 310. Cache controller 130 may analyze tag pointer "6" in line 4 of tag pointer sector 310 and store tag "1100" in line 6 of tag sector 162 with a data pointer of "4".

FIG. 3B illustrates the example system of FIG. 1 relating to an example of decoupled tag and data values with an indexing scheme access, arranged in accordance with at least some embodiments described herein. FIG. 3B includes elements in system 100 of FIG. 1 and FIG. 3A, with additional details. Those components in FIG. 3B that are labeled identically to components of FIG. 1 and FIG. 3A will not be described again for the purposes of clarity and brevity.

In some examples, when pointer mode bit register 144 is activated, cache controller 130 may access data in data sector 160 by searching in tag sector 162. In an example shown in FIG. 3B, memory address 340 may be requested by program 108 during execution. Cache controller 130 may analyze index "5" from memory address 220 and extract tag "1010" from line 5 of tag sector 162. Cache controller 130 may identify and compare tag "1010" from line 5 of tag sector 162 to tag "1010" of memory address 340. Cache controller 130 may determine a cache hit has occurred and identify data pointer "2" in line 5 of data pointer sector 320. Cache controller 130 may then retrieve data "B" from line 2 of data sector 160.

In another example illustrated in FIG. 3B, memory address 350 in memory 106 may be requested by program 108 during execution. Cache controller 130 may identify index "6" from memory address 330 and analyze line 6 of tag sector 162. Line 6 of tag sector 162 may not include any data. Cache controller 130 may determine a cache miss has occurred and retrieve data "D" from memory 106. Cache controller 130 may retrieve data "D" from memory 106 and store data "D" into line 4 of data sector 160 and index "6" in line 4 of tag pointer sector 310. Cache controller 130 may analyze tag pointer "6" in tag pointer sector 310 and store tag "1100" in line 6 of tag sector 162. Cache controller 130 may store data pointer "4" in line 6 of data pointer sector 320.

Among other features, a system in accordance with the disclosure may decouple tag and data values in a cache. Some programs may benefit from sequential access of data from the decoupled data sector as shown in FIG. 3A. Some programs may benefit from access of data by an indexing scheme from the decoupled tag sector as shown in FIG. 3B.

In an example, tag sector 162 may include more lines than data sector 160. By providing extra lines, when new data is stored in cache 114, the data may be stored in the data sector 160 even if the corresponding index line has already be used in tag sector 162. Without use of pointers, if data is stored in the index line, new data may otherwise replace old data.

Figure 4:
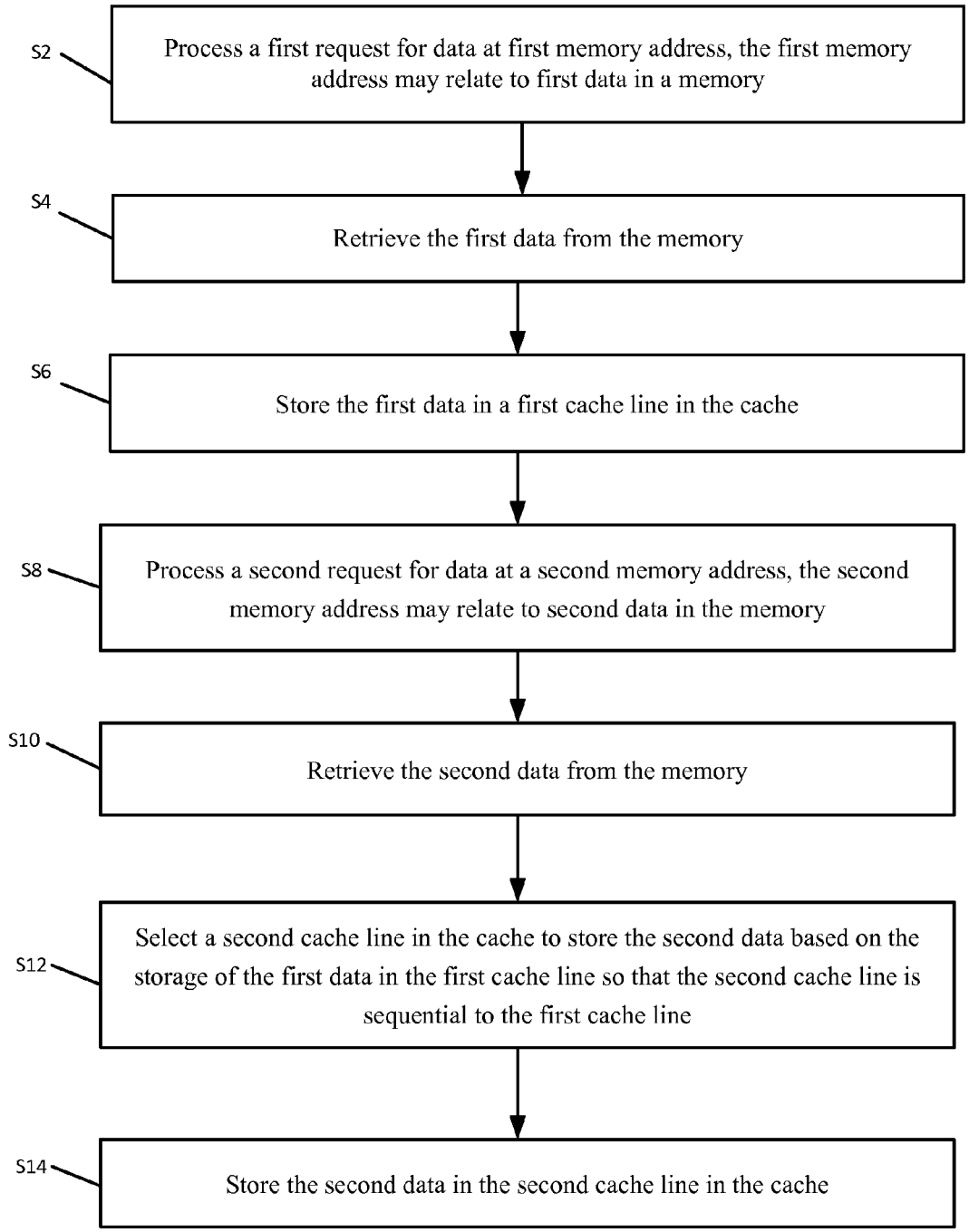
FIG. 4 illustrates a flow diagram for an example process to implement sequential access of cache data.

FIG. 4 illustrates a flow diagram for an example process to implement sequential access of cache data, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, supplemented with additional blocks, or eliminated, depending on the particular implementation.

Processing may begin at block S2, "Process a first request for data at a first memory address, the first memory address may relate to first data in a memory." At block S2, a cache controller may process a first request for data at a first memory address. The first memory address may relate to first data in a memory. The cache controller may be configured to be in communication with a cache.

Processing may continue from block S2 to block S4, "Retrieve the first data from the memory." At block S4, the cache controller may retrieve the first data from the memory.

Processing may continue from block S4 to block S6, "Store the first data in a first cache line in the cache." At block S6, the cache controller may store the first data in a first cache line in the cache.

Processing may continue from block S6 to block S8, "Process a second request for data at a second memory address, the second memory address may relate to second data in the memory." At block S8, the cache controller may process a second request for data at a second memory address. The second memory address may relate to second data in the memory.

Processing may continue from block S8 to block S10, "Retrieve the second data from the memory." At block S10, the cache controller may retrieve the second data from the memory.

Processing may continue from block S10 to block S12, "Select a second cache line in the cache to store the second data based on the storage of the first data in the first cache line so that the second cache line is sequential to the first cache line." At block S12, the cache controller may select a second cache line in the cache to store the second data. Selection of the second cache line in the cache may be based on the storage of the first data in the first cache line. The second cache line may be sequential to the first cache line. The second cache line may be one line from the first cache line.

Processing may continue from block S12 to block S14, "Store the second data in the second cache line in the cache." At block S14, the cache controller may store the second data in the second cache line in the cache. The first data and the second data may both be mapped to a mapped cache line in the cache. At least one of the first data and the second data may be stored in a cache line different from the mapped cache line.

The cache controller may be configured to process a third request to access the first data. Processing of the third request to access the first data may include reading the first data from the first cache line. The cache controller may be further configured to retrieve the second data from the second cache line in the cache and may store the second data in a buffer. The cache controller may be further configured to process a fourth request to access the second data. The fourth request to access the second data may include a tag value. Processing of the fourth request may include searching the second cache line for the second data before searching other lines in the cache. Searching the second cache line for the second data may include identifying a value of a tag pointer in the second cache line. Searching the second cache line for the second data may further include searching a line in a tag sector of the cache to determine whether the tag value in the fourth request matches a tag value in the line in the tag sector. The line in the tag sector of the cache may correspond to the value of the tag pointer.

In some examples, processing of the third request to access the first data may include reading the first data from the first cache line. Processing of the fourth request may include searching the second cache line for the second data before searching other lines in the cache. Processing of the fourth request may include identifying that an index mode value has changed. The identification that the index mode value has changed may be based on a number of cache misses and/or based on a command from a program. In response to identification that the index mode value has changed, the cache controller may process a fifth request to access third data. The fifth request to access the third data may include an index number. The cache controller may further search an index sector of the cache for a value that corresponds to the index number in the fifth request.

In some examples, the third request may include an index number. Processing of the third request to access the first data may include searching an index sector of the cache for a value that corresponds to the index number in the third request.

In some examples, the third request may include a tag number and an index number. The cache controller may search an index line in a tag sector of the cache. The index line in the tag sector of the cache may correspond to the index number in the third request. The cache controller may identify a tag in the index line of the cache and may identify a value in a data pointer field in the index line of the cache. The cache controller may retrieve data in a data sector of the cache at a data line where the data line may correspond to the value.

FIG. 5 illustrates an example computer program product 500 that can be utilized to implement sequential access of cache data, arranged in accordance with at least some embodiments described herein. Computer program product 500 may include a signal bearing medium 502. Signal bearing medium 502 may include one or more instructions 504 that, in response to execution by, for example, a processor, may provide the features described above with respect to FIGS. 1-4. Thus, for example, referring to system 100, processor 102 may undertake or cause to be undertaken the operations depicted in one or more of the blocks shown in FIG. 5 in response to instructions 504 conveyed to the system 100 by signal bearing medium 502 and then executed.

In some implementations, signal bearing medium 502 may encompass a non-transitory computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 608, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communication medium 510 (e.g., a wireless communication medium conforming with the IEEE 802.11 standard).

FIG. 6 is a block diagram illustrating an example computing device that is arranged to implement sequential access of cache data, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 (which may be the previously described processor 102) may include one or more levels of caching, such as a level one cache 610 and a level two cache 612, processor core(s) 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 (which may be the previously described memory 106) may include an operating system 620 (which may be the previously described operating system 104), one or more applications 622, and program data 624. Application 622 may include a sequential access algorithm 626 that is arranged to perform the operations as described herein including those described with respect to system 100 of FIGS. 1-3B and/or the example process of FIG. 4. Program data 624 may include sequential access data 628 that may be useful to implement sequential access of cache data as is described herein. In some embodiments, application 622 may be arranged to operate with program data 624 on operating system 620 such that sequential access of cache data may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to access data in a cache, the method comprising:

processing a first request for data at a first memory address, wherein the first memory address relates to first data in a memory, and wherein the first memory address includes a first tag and a first index number;

retrieving the first data, which corresponds to the first tag and the first index number, from the memory;

storing the first data in a first cache line of the cache, wherein the first cache line is different from a cache line indicated by the first index number;

storing the first tag in a first line of a tag sector of the cache;

processing a second request for data at a second memory address, wherein the second memory address relates to second data in the memory, and wherein the second memory address includes a second tag and a second index number;

in response to processing the second request for data at the second memory address:
retrieving the second data, which corresponds to the second tag and the second index number, from the memory; and
selecting based on the storage of the first data in the first cache line, a second cache line of the cache to store the second data, so that the second cache line is sequential to the first cache line;

storing the second data in the second cache line of the cache, wherein the second cache line is different from a cache line indicated by the second index number;

storing the second tag in a second line of the tag sector of the cache;

processing a third request to access the first data, wherein the third request includes a third tag and a third index number;

comparing a value of the third tag with a value of the first tag stored in the first line of the tag sector of the cache;

in response to a determination that the value of the third tag and the value of the first tag are the same, reading the first data from the first cache line;

processing a fourth request to access the second data, wherein the fourth request includes a fourth tag and a fourth index number;

searching the second cache line for the second data before searching other cache lines of the cache;

comparing a value of the fourth tag with a value of the second tag stored in the second line of the tag sector of the cache;

in response to a determination that the value of the fourth tag and the value of the second tag are the same, reading the second data from the second cache line;

identifying an activation of an index access mode of the cache, wherein identifying the activation of the index access mode of the cache is based on an identification that an index mode value has changed;

after identifying the activation of the index access mode, processing a fifth request to access third data, wherein the fifth request to access the third data includes a fifth index number; and based on the index access mode being activated, searching an index sector of the cache for a value that corresponds to the fifth index number.

2. The method of claim 1, wherein the second cache line is separated by one line from the first cache line.

3. The method of claim 1, wherein searching the second cache line for the second data includes:
identifying a value of a tag pointer in the second cache line; and
searching a line of the tag sector of the cache to determine whether the value of the fourth tag in the fourth request to access the second data matches a tag value in the line of the tag sector, wherein the line of the tag sector corresponds to the value of the tag pointer.

4. The method of claim 1, further comprising, prior to processing the fourth request to access the second data:
retrieving the second data from the second cache line of the cache; and
storing the second data in a buffer.

5. The method of claim 1, wherein the identification that the index mode value has changed is based on a number of cache misses or based on a command from a program.

6. The method of claim 1, wherein reading the first data from the first cache line comprises:
searching an index line of the tag sector of the cache, wherein the index line of the tag sector corresponds to the third index number;
identifying the third tag in the index line of the tag sector of the cache;
identifying a value in a data pointer field in the index line; and
retrieving data from a data sector of the cache at a data line that corresponds to the value in the data pointer field.

7. The method of claim 1, wherein:
the first data and the second data are both mapped to a mapped cache line of the cache, and
at least one of the first data and the second data is stored in a cache line different from the mapped cache line.

8. A method to access data in a cache, the method comprising:

processing a first request for data at a first memory address, wherein the first memory address relates to first data in a memory at a first memory index line;

retrieving the first data from the memory;

identifying a mapped cache line that is mapped to the first memory index line;

storing the first data in a first cache line of the cache, wherein the first cache line is different from the mapped cache line;

storing a value in an index sector in the first cache line, where the value identifies the first memory index line;

processing a second request for data at a second memory address, wherein the second memory address relates to second data in the memory at a second memory index line;

in response to processing the second request for data at the second memory address:
retrieving the second data from the memory; and
selecting, based on the storage of the first data in the first cache line, a second cache line of the cache to store the second data, so that the second cache line is sequential to the first cache line;

storing the second data in the second cache line of the cache;

processing a third request to access the first data;

reading the first data from the first cache line;

processing a fourth request to access the second data;

searching the second cache line for the second data before searching other cache lines of the cache;

reading the second data from the second cache line;
identifying an activation of an index access mode of the cache based on a determination that a number of cache misses has reached a threshold value, wherein identifying the activation of the index access mode of the cache is based on an identification that an index mode value has changed;
after identifying the activation of the index access mode, processing a fifth request to access third data, wherein the fifth request to access the third data includes an index number; and
based on the index access mode being activated, searching an index sector of the cache for a value that corresponds to the index number.

9. A processor, comprising:
a core;
a cache; and
a cache controller configured to be in communication with the core and the cache, wherein the cache controller is effective to:
   process a first request for data at a first memory address, wherein the first memory address relates to first data in a memory, and wherein the first memory address includes a first tag and a first index number;
   retrieve the first data, which corresponds to the first tag and the first index number, from the memory;
   store the first data in a first cache line of the cache, wherein the first cache line is different from a cache line indicated by the first index number;
   store the first tag in a first line of a tag sector of the cache;
   process a second request for data at a second memory address, wherein the second memory address relates to second data in the memory, and wherein the second memory address includes a second tag and a second index number;
   in response to processing the second request for data at the second memory address:
      retrieve the second data, which corresponds to the second tag and the second index number, from the memory; and
      select, based on the storage of the first data in the first cache line, a second cache line of the cache to store the second data, so that the second cache line is sequential to the first cache line;
   store the second data in the second cache line of the cache, wherein the second cache line is different from a cache line indicated by the second index number;
   store the second tag in a second line of the tag sector of the cache;
   process a third request to access the first data, wherein the third request includes a third tag and a third index number;
   compare a value of the third tag with a value of the first tag stored in the first line of the tag sector of the cache;
   in response to a determination that the value of the third tag and the value of the first tag are the same, read the first data from the first cache line;
   process a fourth request to access the second data, wherein the fourth request includes a fourth tag and a fourth index number;
   search the second cache line for the second data before other cache lines of the cache are searched;
   compare a value of the fourth tag with a value of the second tag stored in the second line of the tag sector of the cache;
   in response to a determination that the value of the fourth tag and the value of the second tag are the same, read the second data from the second cache line;
   identify an activation of an index access mode of the cache, wherein the identification of the activation of the index access mode of the cache is based on an identification that an index mode value has changed;
   after the identification of the activation of the index access mode, receive a fifth request to access third data, wherein the fifth request to access the third data includes a fifth index number; and
   based on the index access mode being activated, search an index sector of the cache for a value that corresponds to the fifth index number.

10. The processor of claim 9, wherein the second cache line is separated by one line from the first cache line.

11. The processor of claim 9, wherein to search the second cache line for the second data, the cache controller is effective to:
   identify a value of a tag pointer in the second cache line; and
   search a line of the tag sector of the cache to determine whether the value of the fourth tag in the fourth request to access the second data matches a tag value in the line of the tag sector, wherein the line of the tag sector corresponds to the value of the tag pointer.

12. The processor of claim 9, wherein the cache controller is further effective to, prior to receipt of the fourth request to access the second data:
   retrieve the second data from the second cache line of the cache; and
   store the second data in a buffer.

13. The processor of claim 9, wherein the identification that the index mode value has changed is based on a number of cache misses or based on a command from a program.

14. The processor of claim 9, wherein the cache controller is further effective to:
   search an index line of the tag sector of the cache, wherein the index line of the tag sector corresponds to the third index number;
   identify the third tag in the index line of the tag sector of the cache;
   identify a value in a data pointer field in the index line; and
   retrieve data from a data sector of the cache at a data line that corresponds to the value in the data pointer field.

15. The processor of claim 14, wherein:
the tag sector is stored in a first type of memory, and
the data sector is stored in a second type of memory different from the first type.

16. The processor of claim 9, wherein:
the first data and the second data are both mapped to a mapped cache line of the cache, and
at least one of the first data and the second data is stored in a cache line different from the mapped cache line.

* * * * *

UNITED STATES PATENT AND TRADEMARK OFFICE
CERTIFICATE OF CORRECTION

| | |
|---|---|
| PATENT NO. | : 9,811,469 B2 |
| APPLICATION NO. | : 14/407761 |
| DATED | : November 7, 2017 |
| INVENTOR(S) | : Vajapeyam |

It is certified that error appears in the above-identified patent and that said Letters Patent is hereby corrected as shown below:

In the Specification

In Column 11, Line 37, delete "608," and insert -- 508, --, therefor.

In the Claims

In Column 15, Line 29, in Claim 1, delete "selecting based" and insert -- selecting, based --, therefor.

Signed and Sealed this
Twenty-fourth Day of April, 2018

Andrei Iancu
*Director of the United States Patent and Trademark Office*